United States Patent [19]

Niedenthal et al.

[11] Patent Number: 4,752,486
[45] Date of Patent: Jun. 21, 1988

[54] TUBULAR FOOD CASINGS WITH IMPROVED END CLOSURES

[75] Inventors: Mark J. Niedenthal, Rossville; Fredric N. Miller, Naperville; Rodney J. Hine, Danville, all of Ill.; John P. Lithgow, Indianapolis, Ind.

[73] Assignee: Teepak, Inc., Oak Brook, Ill.

[21] Appl. No.: 809,100

[22] Filed: Dec. 16, 1985
(Under 37 CFR 1.47)

[51] Int. Cl.[4] .............................................. A22C 13/00
[52] U.S. Cl. .................... 426/118; 138/118.1; 426/140; 428/36
[58] Field of Search ............... 426/105, 135, 138, 140, 426/118, 410, 412; 138/118.1; 428/36

[56] References Cited

U.S. PATENT DOCUMENTS

| 2,704,259 | 3/1955 | Lamb | 99/176 |
| 3,780,488 | 12/1973 | Herrell | 53/38 |
| 3,892,896 | 7/1975 | Sheridan et al. | 426/140 X |
| 3,965,537 | 3/1976 | Ross et al. | 17/42 |
| 4,183,964 | 3/1980 | Vinokur | 426/412 |
| 4,289,569 | 9/1981 | Rabeneck et al. | 136/580 |
| 4,411,048 | 10/1983 | Green | 426/140 X |

FOREIGN PATENT DOCUMENTS 87241 8/1983 European Pat. Off. .
128668 12/1984 European Pat. Off. .

Primary Examiner—Arthur L. Corbin
Attorney, Agent, or Firm—Howard M. Ellis; Michael L. Dunn

[57] ABSTRACT

Permanently bonded, highly reliable end-closures are formed on shirred tubular strands with less film waste and without applying adhesives by occluding deshirred film from one end of the strand and sealing the occluded film by the application of sufficient pressure and energy to cause gelation and adhesion of the film surfaces.

5 Claims, 2 Drawing Sheets

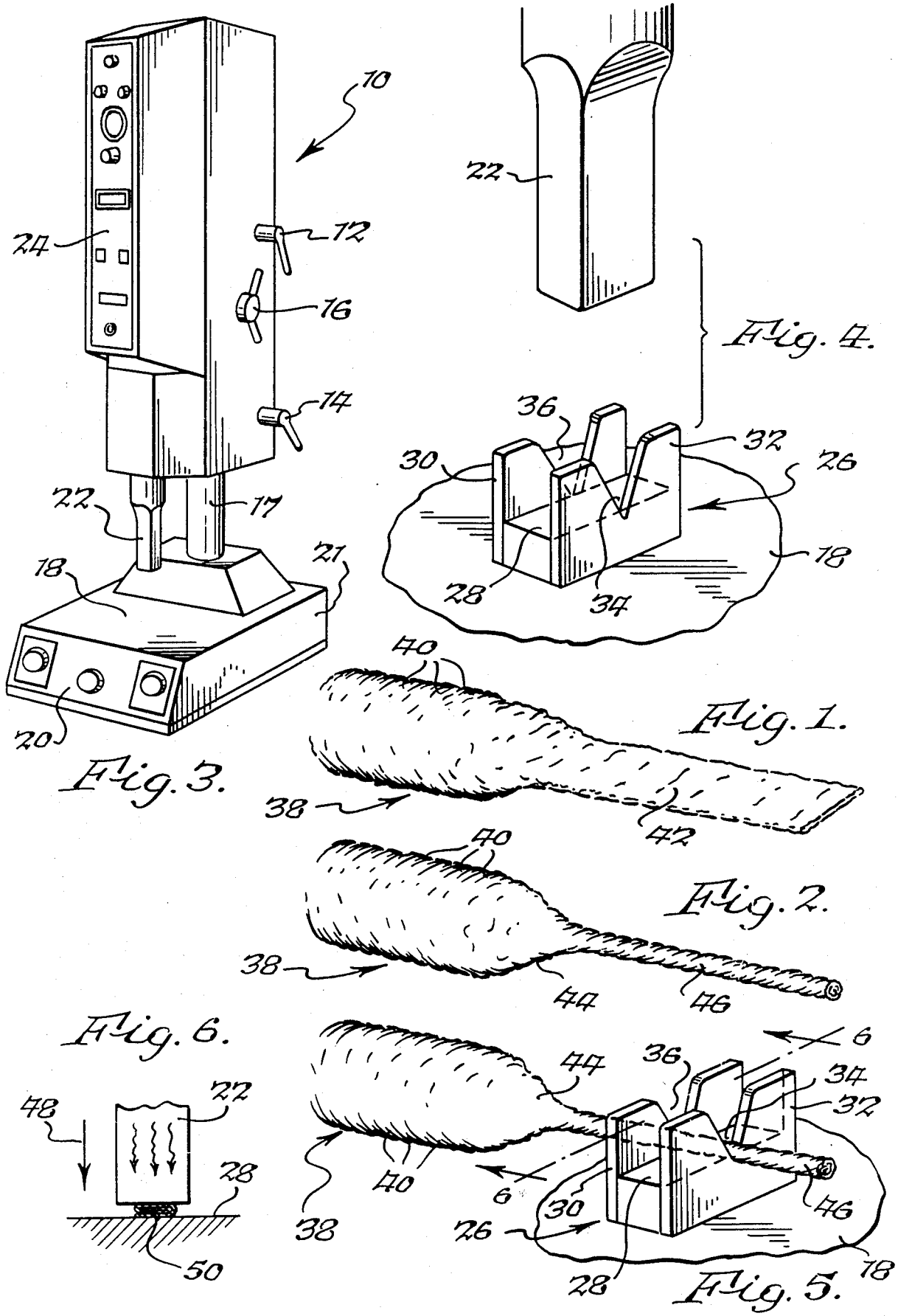

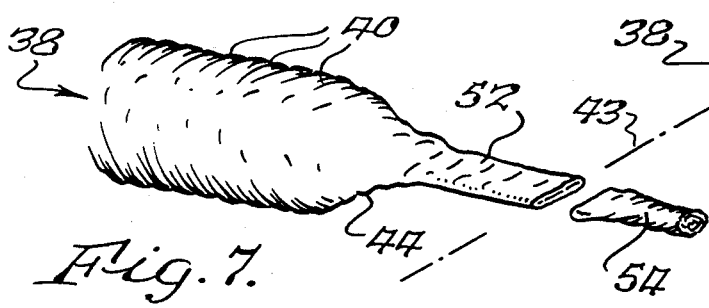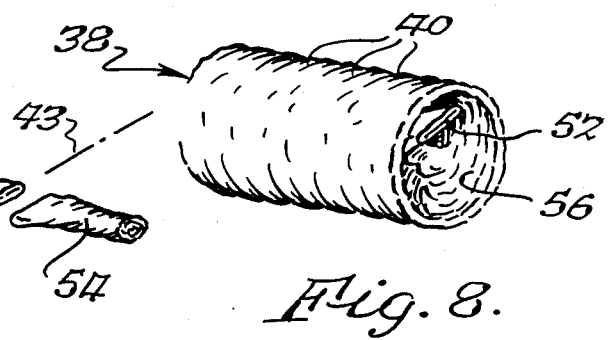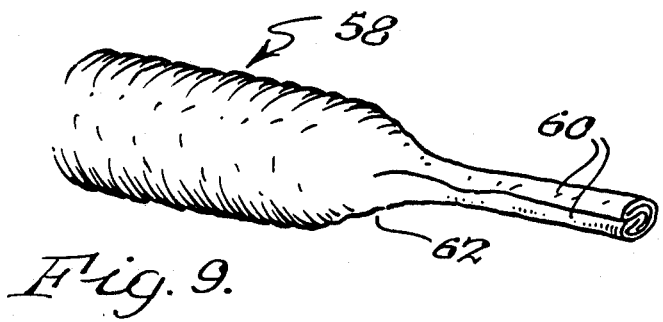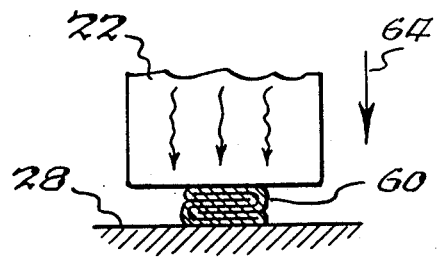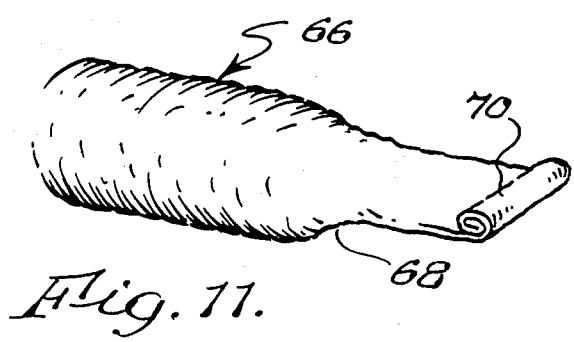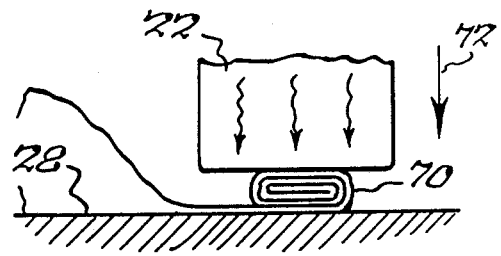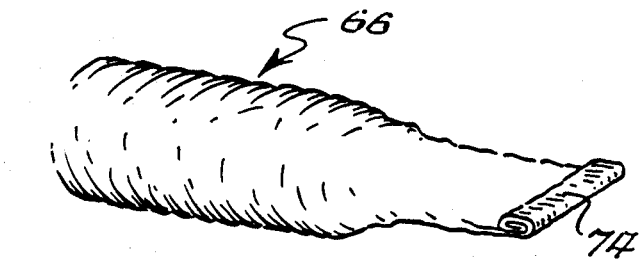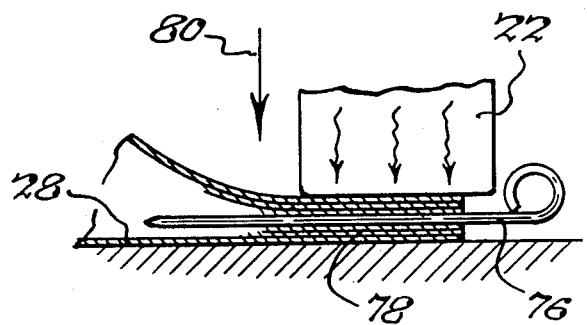

TUBULAR FOOD CASINGS WITH IMPROVED END CLOSURES

BACKGROUND OF THE INVENTION

The present invention relates to films used principally in packaging food products, and more specifically, to improved strands of tubular casings for packaging sausage and other meat products, and methods for their manufacture.

Food casings fabricated from either edible or nonedible films have been widely used for many years in processing and packaging various meat products like frankfurters, sausages, bolognas, hams, deli loaves and the like. Nonedible cellulose type casings, for example, are prepared by extruding tubular viscose into a coagulating bath where it is regenerated, washed, plasticized, dried and formed into flat tubular films by winding onto large reels. Edible type casings, especially those prepared with collagen are manufactured as hollow, thin-walled tubes also of substantial length.

For convenience in handling and stuffing, it has been standard practice of casing manufacturers to convert much of such film into pleated, hollow tubular strands or sticks on high speed shirring machines where, for example, up to 200 feet of casing material is pleated into sticks generally ranging from about 5 to 30 inches in length. Such strands are packaged and shipped to meat processors and packers where they are automatically fed onto horns and stuffed with meat emulsion, etc., to their fully extended lengths.

During earlier years when casings were stuffed manually, operators would simply deshirr a short length of casing at the stuffing site to form an end-closure so as to prevent loss of meat from the receiving end of the strand. However, in the case of modern high speed automated filling equipment such operations have dictated that end-closures be formed during manufacture of casings, rather than during filling.

Various methods have been proposed for making end-closures on shirred strands. Closures may be formed which extend outwardly from the strand, or alternatively, they can be recessed inside strand bores. For instance, U.S. Pat. No. 3,965,537 discloses a method for sealing ends of edible collagen casings by joining opposing internal surfaces and heat sealing at an oblique angle across the full width of the deshirred end. Although this method reduces the film needed in forming end-closures it does not provide for venting air when the stuffing horn indexes the casing. This results in premature deshirring of the strand, which in turn causes frequent casing blow-outs and lost production from downtime. In addition, the oblique heat seal is not always reliable in providing the strength and resiliency needed to absorb the initial shock of meat emulsion being forced into the casing under high pressure. This can result in a relatively high rate of casing failure.

U.S. Pat. No. 4,536,175 discloses an alternative method for making end-closures for collagen casings. Instead of heat sealing, the end-closure is formed inside the bore of the strand. Film from the strand end is wound into a plug which is positioned centrally inside the bore without fully deshirring the film as the plug is being wound. Similarly, U.S. Pat. No. 3,162,893 provides for a twisted end-closure without heat sealing, except that the closure remains on the outside of the strand. The casing end-closure is twisted upon itself or tied closed. Although the latter methods reduce the incidence of casing blow-out during stuffing each of the immediate foregoing methods require significant lengths of film, up to 14 inches, in forming their respective twisted end-closures. This results in a rather significant amount of waste because the film used in forming the closure is unavailable for packaging during stuffing operations, thereby leading to higher production costs. Accordingly, there is a need for more economic and reliable end-closures for shirred strands, and more particularly, to improved end-closures for shirred collagen casings and methods of manufacture.

SUMMARY OF THE INVENTION

It has now been found that improved end-closures for food casings can be prepared which are not only more reliable in terms of fewer incidents of failure as a result of end blow-out, but also more economic in requiring significantly less film in forming such closures. Generally, a short length of film is deshirred from one end of the strand, the deshirred end occluded and sealed by applying sufficient energy to heat the strand and cause adhesion. A narrowed neck portion is first formed at the end of the strand by initially deshirring the terminal pleats to provide approximately 1 to 2 inches or less of film. Because the narrowed neck portion is formed by gathering the deshirred end as by twisting etc., the end-closures are able to absorb the initial shock with the commencement of stuffing without rupturing.

Sealing of the closure is performed by applying sufficient energy and pressure to the gathered film portion to cause selfadhesion. Heat may be applied from any external source, such as by direct contact of a heat sealer or equivalent device. Heat for sealing may also be generated in-situ by introducing other forms of energy such as ultrasound for welding the narrowed neck region. The application of sufficient heat and pressure causes the gathered film surfaces to seal against one another to form a strong, permanent, water resistant bond capable of withstanding the forces generated during the stuffing process without rupturing.

The methods of the present invention also provide the unexpected advantage in making end-closures for collagen type casings. Previously, such strands required the application of special food approved adhesives before sealing in order to form a secure end-closure. Highly reliable heat seals for collagen casings can now be prepared according to the present invention without the application of additional adhesive.

BRIEF DESCRIPTION OF THE DRAWINGS

For a further understanding of the invention as well as its characterizing features, reference should now be made to the following detailed description thereof taken in conjunction with the accompanying drawings wherein:

FIG. 1 is a partial perspective view of a shirred strand of food casing with a short length of film deshirred from one end.

FIG. 2 is a partial perspective view of the deshirred end of FIG. 1 which has been twisted.

FIG. 3 is a perspective view of an ultrasonic welding unit.

FIG. 4 is a perspective view of the sealing horn of the ultrasonic welder of FIG. 3 and complimentary welding fixture.

FIG. 5 is a partial perspective view of the twisted end-closure shown in FIG. 2 positioned in the welding fixture prior to being sealed.

FIG. 6 is a side elevational and sectional view of the sealing horn of the welder unit compressing the twisted end-closure in the fixture taken along line 6—6 of FIG. 5.

FIG. 7 is a partial perspective view of the twisted and welded end-closure on a shirred strand with terminal end severed.

FIG. 8 is a partial perspective view of the finished end-closure of FIG. 7 positioned in the bore of the strand.

FIG. 9 is a partial perspective view of an alternative occlusion of the deshirred film prior to heating.

FIG. 10 is an end view of the closure of FIG. 9 being sealed with the application of heat and pressure.

FIG. 11 is a partial perspective view of a further alternative occlusion of the deshirred film prior to heating.

FIG. 12 is a side view of the end-closure of FIG. 11 being sealed with the application of heat and pressure.

FIG. 13 is a partial perspective view of the strand of FIG. 11 with the finished end-closure after being heat sealed according to FIG. 12.

FIG. 14 is a partial side cross-sectional view of and end-closure being sealed according to the present invention with means for forming an air vent.

DESCRIPTION OF THE PREFERRED EMBODIMENTS

Turning first to FIG. 1, there is shown a tubular strand of food film 38 formed from multiple nested pleats 40. The strand of FIG. 1 is formed by first shirring and compacting flattened tubular film into a hollow pleated stick without an end-closure (not shown) generally of a length ranging from 5 to 30 inches using methods known in the art. The strand may consist of either nonedible or edible film, such as collagen, etc. Terminal pleats of strand 38 are first deshirred by axially withdrawing from one end sufficient film to provide a substantially flattened section 42 of approximately 1 to about 2 inches or less in length. The deshirred length is converted into an end-closure according to the present invention by twisting, folding or rolling the film into an occluded section 46. A narrowed neck portion 44 (FIG. 2) is formed which is a tapered region between the pleated film and the occlusion.

The minimum length of film deshirred from pleated strands for the closures will usually vary depending on the film diameter and the type of occlusion formed. For example, small casing codes having diameters up to 20 mm usually require about 1 inch or less of deshirred film. Larger intermediate codes up to 30 mm in diameter usually require somewhat longer lengths when the occlusion is formed by twisting instead of rolling. Minimum requirements for large codes of greater than 30 mm are about 2 inches. In each instance, the objective is to withdraw the least amount of film needed to form a reliable multi-ply end-closure. The expressions "multi-ply" and "multiple-plies" as used herein are intended to mean 4 or more single layers of deshirred tubular film gathered to form an end-closure.

In one embodiment, the twisted end-closure 46 (FIG. 2) is formed with 2 to about 8 twists of the film. A twisted occlusion can be made by gripping and rolling the film to form a tightly compacted closure, which is then permanently sealed by applying pressure and sufficient thermal energy to cause adhesion. More specifically, an acceptable seal according to the present invention is intended to mean one prepared by first occluding the deshirred end of a shirred strand by twisting, etc., to form multiple plies of tightly compacted film which plies, when exposed to sufficient energy and pressure, undergo gelation and adhesion of the film surfaces to each other to produce a permanently fused, nonswollen, tightly compacted, solid closure without requiring special adhesives, support clips, etc. The term "gelation" as used herein is intended to mean fusion of the film surfaces together by heat followed by solidification on cooling.

The seal may be formed by introducing sufficient thermal energy into the occluded end-closure from an outside source of heat, such as by a hot bar type sealer, heat impulse welder, hot plate welder, etc., each of which involves the application of heat and pressure to the workpiece. The expression hot bar sealing is intended to refer to contact welding methods employing one or more constantly heated electrodes. By contrast, thermal impulse sealing is intended to include processes which apply heat by compressing the occluded film between elements equipped to provide a pulse of intense thermal energy for a very brief time interval, followed immediately by cooling. Hot plate welding with a heated tool, such as a spatula or forceps may also be used. This method entails holding the occluded end-closure against a heated metal surface then compressing the film under moderate pressure until cool. Other methods according to the present invention include forming seals by dielectric means which induce heat in the film with radio frequency waves.

Most preferably, however, the occluded permanently fused, solid nonswollen seals of the invention are formed by ultrasonic methods. Generally, this means that heating is accomplished with vibratory mechanical pressure at ultrasonic frequencies of about 20,000 Hz at low amplitude. According to this preferred method, electrical energy is transformed into high frequency mechanical vibrations by means of a transducer which produces molecular oscillation of the film. When compressed with the horn of the welding unit, localized heat is generated as a result of friction of vibration at the joined surfaces of the film.

FIG. 3 illustrates a bench scale ultrasonic welding unit 10 consisting of a welding horn 22 shown in a retracted nonworking position. Means for operating the welder including power and downspeed controls, weld time controls, hold time, pressure controls etc. are provided on front control panel 24. Welding unit 10 is mounted to a pedestal base 21 through connecting shaft 17. Vertical height adjustments are made through side mounted hand controls 12, 14 and 16. Base 21 includes a stage 18 for supporting the workpiece to be sealed, and dual safety switches mounted on the lower front panel 20 for actuating the unit by lowering welding horn 22 into working position.

FIG. 4 illustrates a welding fixture 26 positioned on stage 18. Fixture 26 is specially adapted to engage with horn 22 when the horn is extended downwardly in working position. The welding fixture includes a seal 28, parallel sidewalls 30 and 32 each with a V-shaped groove 34 and 36 for mounting the occluded film. The later feature is best illustrated in FIG. 5.

Which ever method is selected, sealing is performed by introducing sufficient heat and pressure over a brief interval as to produce a gelation of the film surfaces without overexposing and degrading the film. That is, in order to form a permanently fused, nonswollen, tightly compacted solid closure, sufficient thermal or vibratory energy must be introduced, usually under pressure, to raise the film surfaces to their gelation temperature. Without the application of sufficient heat and pressure the end-closure will be weak, will lack the necessary peel strength, and may fail. Likewise, overheating by applying excess thermal energy over protracted intervals can damage the film in the region of the seal causing it to lose tensile strength and elongation properties which are specially important in avoiding rupture during filling. Hence, overheating can also result in strand failure.

FIG. 6 shows welding horn 22 in compressive engagement with the twisted multi-ply end-closure 50 when the horn is moved in a downward direction 48. The vibrating horn instantaneously heats, gels and fuses the twisted and rounded closure into a flattened, fused, permanently sealed mass. The actual length of the heating cycle and temperatures employed can be ascertained through exercise of ordinary skill. They are dependent, for example, on the composition of the film being sealed, thickness of the film as well as moisture content. Freshly made collagen strands having moisture levels in the range of about 15 to 25 percent based on total casing weight can be heated at temperatures from about 50° to about 175° C. or more. Temperatures in the lower part of this range may require longer exposure times especially with higher moisture levels for gelation of the film to occur. Longer heating intervals will also be required with older casings. This was demonstrated on a model 8400 Branson ultrasonic welder available from the Branson Sonic Power Company, Danbury, Conn., generally illustrated in FIG. 3. The ultrasonic welder operating at a frequency from about 19,900 to 20,100 Hz and an amplitude from 0 to 0.010 inches provided reliable heat seals using the welding fixture illustrated in FIGS. 4 and 5. It was found that heat seals according to the present invention can be prepared with weld times ranging from 0.1 to about 2.0 seconds. Hold times for cooling may vary from 0.1 to about 1.0 second. Applied pressures may range from 40 to 300 psi. The following table provides actual machine settings and exposure times for collagen casings:

TABLE

| Machine Adjustment* | Fresh Casing | Older Casing |
| --- | --- | --- |
| Down Speed | 11 | 11 |
| Weld Time | .2 sec. | .5 sec. |
| Hold Time | .5 sec. | .75 |
| Pressure | 50 psi | 70 psi |
| Trigger Setting | 10 | 16 |

*Branson Model 8400 ultrasonic welder

It will be understood, in principle, sealing cycles can be shortened by utilizing elevated temperatures and pressures without necessarily degrading the film. Likewise, heating cycles can be lengthened provided more moderate temperatures and pressures are utilized.

Optionally, at the conclusion of the heating cycle, the terminal end 54 of the closure 52 can be trimmed by cutting as shown at FIG. 7. By allowing the end-closure to remain on the outside of the strand at the completion of the process it may interfere with filling operations, etc. Hence, closure 52 whether trimmed or untrimmed may be tucked into bore 56 (FIG. 8) in order to facilitate packaging, stuffing and handling.

In addition to the twisting technique previously described, the deshirred film may also be occluded by folding or rolling. In this regard, the present invention also contemplates alternative embodiments, such as shown in FIG. 9 where prior to heat sealing the deshirred end of strand 58 is folded into a narrowed neck portion 62 by forming tightly compacted pleats 60 which run parallel to the longitudinal axis of the strand. In the case of small diameter casings, such as used in stuffing frankfurters and sausage links 2 to about 6 folds of the deshirred tubular end will usually be adequate. Larger diameter casings will require additional longitudinal folds. Subsequently, the folded end-closure is sealed (FIG. 10) with welding horn 22 shown in downward working position 64.

A further alternative is shown in FIGS. 11 through 13 where strand 66 is formed into a necked-in section 68. The terminal end of the deshirred film is turned about 2 to 4 times transversely to the longitudinal axis of the strand to form multiple plies of tightly rolled film 70. This embodiment requires the least amount of film in forming a permanently sealed end-closure, according to the present invention. Rolled end 70 is then heated (FIG. 12) with welding horn 22 in downward working position 72. In about 1 second the rolled end is converted into a flattened, tightly compacted, permanently fused closure 74.

In forming closures as described hereinabove it may also be desirable to provide means for venting air from the strand. This is advantageous because during the stuffing process it can reduce the potential for rupturing. By twisting or folding the end-closure 78 (FIG. 14) around air vent tool 76 in the form of a pin-like metal rod, downward compression 80 with the application of heat will cause the film to fuse about the tool. The tool may then be extracted from the closure after cooling leaving a small hole for venting air from the strand during the stuffing process.

Although the invention has been described in considerable detail with respect to the preferred embodiments, thereof, it will be apparent that the invention is capable of numerous modifications and variations to those skilled in the art without departing from the spirit and scope of the invention, as defined in the appended claims.

What is claimed is:

1. A food casing, which comprises a pleated strand of tubular film having at one end of said strand an end-closure comprising a length of deshirred film gathered into a multi-ply end-closure of twisted, folded or rolled film permanently sealed with sufficient energy and pressure to cause gelation and adhesion of said twisted, folded or rolled film.

2. The casing of claim 1 formed from an edible film.

3. The casing of claim 2 wherein the edible film is collagen.

4. The casing of claim 3 wherein the end-closure includes an outlet for venting air.

5. An edible food casing, which comprises a pleated strand of tubular collagen film having an end-closure comprising a length of said film deshirred from one end of said strand, twisted into a multi-ply closure and permanently sealed with sufficient energy and pressure to cause gelation and adhesion of said twisted film.

* * * * *

UNITED STATES PATENT AND TRADEMARK OFFICE
CERTIFICATE OF CORRECTION

PATENT NO. : 4,752,486
DATED : June 21, 1988
INVENTOR(S) : Donald K. Gilbert, Mark J. Niedenthal, Fredric N. Miller, Rodney J. Hine and John P. Lithgow It is certified that error appears in the above-identified patent and that said Letters Patent are hereby corrected as shown below:

Cover page, first column,

[75] Inventors: Mark J. Niedenthal, Rossville;
Fredric N. Miller, Naperville;
Rodney J. Hine, Danville, all of Ill.,
John P. Lithgow, Indianapolis, Ind.

should read:

[75] Inventors: Donald K. Gilbert, Columbia, S.C.;
Mark J. Niedenthal, Rossville;
Fredric N. Miller, Naperville;
Rodney J. Hine, Danville, all of Ill.,
John P. Lithgow, Indianapolis, Ind.

Signed and Sealed this

First Day of November, 1988

Attest:

DONALD J. QUIGG

Attesting Officer

Commissioner of Patents and Trademarks